United States Patent [19]

Carey et al.

[11] Patent Number: 5,537,717
[45] Date of Patent: Jul. 23, 1996

[54] CARDING ENGINE GUARD

[75] Inventors: Peter Carey; Michael Carstairs; John Varga, all of Halifax, Great Britain

[73] Assignee: Carding Specialists (Canada) Limited, Toronto, Canada

[21] Appl. No.: 182,107

[22] PCT Filed: Jul. 21, 1992

[86] PCT No.: PCT/GB92/01340

§ 371 Date: Feb. 14, 1994

§ 102(e) Date: Feb. 14, 1994

[87] PCT Pub. No.: WO93/02237

PCT Pub. Date: Feb. 4, 1993

[30] Foreign Application Priority Data

Jul. 23, 1991 [GB] United Kingdom ............... 9115881

[51] Int. Cl.⁶ .................................................. D01G 15/76
[52] U.S. Cl. ................................................. 19/98; 19/107
[58] Field of Search ........................... 19/98, 2, 21, 99, 19/102, 105, 112; 484/49, 56, 63, 195; 15/304, 312.1, 312.2, 315; 16/221, 366, 368; 162/262; 180/69.25

[56] References Cited

U.S. PATENT DOCUMENTS

| 1,335,082 | 3/1920 | Stowe | 180/69.25 |
| 1,736,718 | 11/1929 | Moorhouse | 180/69.25 |
| 4,364,151 | 12/1982 | Beneke et al. | 19/2 |
| 4,484,845 | 11/1984 | Pennella, Jr. et al. | 409/134 |
| 4,985,966 | 1/1991 | Witschke | 19/107 |

FOREIGN PATENT DOCUMENTS

| 0203040 | 11/1986 | European Pat. Off. . | |
| 1476615 | 4/1967 | France | 19/107 |
| 2539767 | 7/1984 | France . | |
| 1058246 | 2/1967 | United Kingdom | 19/107 |

Primary Examiner—Ismael Izaguirre
Attorney, Agent, or Firm—Merchant, Gould, Smith, Edell, Welter & Schmidt

[57] ABSTRACT

A carding engine guard arrangement includes carding engine (10) having a longitudinal axis, and respective guards (11) arranged along each side of the carding engine (10), in which at least one of the guards includes a support structure (25) arranged along one side of the carding engine (10), and a door arrangement (12) pivotally mounted on the support structure (25) to pivot about a substantially horizontal hinge axis (13, 17, 20) at or near to the upper edge of the door arrangement between a closed position guarding the side of the carding engine and a raised position allowing full access to the carding engine throughout its length, when the latter is inoperative. In a preferred arrangement, the door arrangement includes upper and lower door panels (14 and 15) in which lower panel (15) is first hinged upwardly about its upper edge (16), and thereafter the overlapping door panels (14 and 15) are hinged together upwardly as a unit about the upper hinge axis (13, 17, 20) to the raised access position.

9 Claims, 5 Drawing Sheets

CARDING ENGINE GUARD

BACKGROUND OF THE INVENTION

This invention relates to a carding engine guard which is intended to shield operating personnel from coming into contact with the rotating parts of a carding engine.

It is essential for carding engines to be provided with suitable guards, since the inertia of a carding engine makes it a dangerous machine to come into contact with while rotating, as even if the machine drive stops quickly, serious injury can still be done. Therefore factory regulations require the provision of carding engine guards, and which must necessarily be sufficiently robust and rigid as to withstand an impact e.g. an unintentional impact from a fork lift truck or trolley travelling alongside the carding engine.

It is present practice to mount an arrangement of doors along each of the two longer sides of a carding engine, with the doors being hingedly mounted in a rigid support frame arranged alongside the card to move about vertical hinge axes between open and closed positions. The doors will be located in the closed position (extending parallel to the longitudinal axis of the card) when the card is operating, but one or more of the doors can be swung out to allow access to be had to the card when the latter has stopped so that routine cleaning or servicing operations can be carried out.

Evidently, with this existing arrangement, the doors project out into any transit path alongside the card, when they are in the open position, and which may therefore impede traffic of personnel or equipment alongside the machine. Also, by this arrangement of the doors, when the doors are open they do not allow easy access to all parts of the card, both by obstruction by the doors themselves, and also by parts of the support frame on which the doors are hingedly mounted.

SUMMARY OF THE INVENTION

The present invention has therefore been developed with a view to providing a carding engine guard which can be constructed as robustly as existing arrangements, but which permits improved access to the carding engine when the guard is adjusted from a guarding position to an open or access position.

According to a first aspect of the invention there is provided a carding engine guard arrangement comprising a carding engine having respective guards arranged along each side of the carding engine and extending generally parallel to the longitudinal axis of the carding engine, each guards being movable between a closed position in which the guard shields the associated side parts of the carding engine and an open position in which the guard allows access to be had to the side parts of the carding engine for servicing/repair purposes, in which at least one of the guards comprises:

a support structure arranged along one side of the carding engine above the side parts of the carding engine which require to be shielded during operations but to which access will be required for servicing/repair operations; and, a door arrangement pivotally mounted on the support structure to pivot about a substantially horizontal hinge axis at or near to the upper edge of the door arrangement between the closed and open positions, said door arrangement comprising a pair of upper and lower folding door panels in which the lower panel is hinged to the upper panel along an upper edge of the lower panel and the upper panel is hinged along its upper edge to form the horizontal top hinge axis of the door arrangement.

According to a second aspect of the invention there is provided a carding engine guard arrangement comprising a carding engine having respective guards arranged along each side of the carding engine and extending generally parallel to the longitudinal axis of the carding engine, each guards being movable between a closed position in which the guard shields the associated side parts of the carding engine and an open position in which the guard allows access to be had to the side parts of the carding engine for servicing/repair purposes, in which at least one of the guards comprises:

a support structure arranged along one side of the carding engine above the side parts of the carding engine which require to be shielded during operation but to which access will be required for servicing/repair operations, said support structure forming part of the side frame structure of the carding engine; and a door arrangement pivotally mounted on the support structure to pivot about a substantially horizontal hinge axis at or near to the upper edge of the door arrangement between the closed position shielding the associated side of the carding engine and a raised open position allowing access to the side parts of the carding engine when the latter is inoperative, and in which the door arrangement provides unimpeded access throughout the length of the side parts of the carding engine when the door arrangement is in the raised open position.

By providing a door arrangement which is hinged for movement about a substantially horizontal top hinge axis, the respective side of the carding engine can be reliably guarded when the door arrangement is in the closed position, but when the door arrangement is upwardly pivoted to the raised position, it can allow full i.e. unimpeded access to the entire length of the carding engine which is covered by the door arrangement when in the closed position.

Preferably, the door arrangement extends substantially throughout the length of the carding engine, so that a unitary structure is provided which is movable in order to guard, or uncover one entire side of the engine.

The door arrangement can be made in any suitable form to perform a guarding function, and in one preferred form may be formed at least partly of a grid or mesh structure to enable the working of the engine to be viewed through the guard structure.

A particularly advantageous form of the door arrangement comprises a pair of upper and lower folding door panels, the lower panel being hinged to the upper panel along an upper edge of the lower panel, and the upper panel being hinged along its upper edge to form the horizontal top hinge axis of the door arrangement. This is preferable to a single door panel which may project laterally of the carding engine to an unacceptable extent when in the open position, if it is made of substantial height to shield all of the side of the carding engine (when in the closed position).

In this particularly preferred form, during raising of the door arrangement the lower door panel is first hinged upwardly through approximately 180° to form a folded door assembly and which allows access to the lower side parts only of the carding engine. However, if access is required throughout the full height of the side parts of the carding engine, then after this movement has been completed is the folded door assembly is hinged upwardly about the top hinge axis through approximately 90°.

Conveniently, the bottom edge of the door assembly can be locked to the floor, and when the assembly is moved to its raised position, no obstruction is presented to full access to the entire side and ends of the carding engine, and without blocking passage to traffic to move alongside the engine i.e. there is no need for a rectangular fixed frame alongside the carding engine in which conventional guards are mounted, and which can impede access to the carding engine.

For safety purposes, it is preferred that a safety interlock is provided, linked to the operation of the engine, and which is triggered to allow upward pivoting of the folded door assembly to the raised position only after the lower panel has first completed its upward hinging movement and when the engine is inoperative.

Conveniently, a respective door arrangement as defined above, with or without the preferred aspects thereof, is provided along each side of the carding engine.

Conveniently, a magnet and proximity switch is provided on the lower door panel, which initiates release of the door arrangement to carry out its further movement to the raised position when the lower door panel has completed its movement. The magnet may retain the lower door panel against the upper door panel by co-operation with a suitable magnetic part of the upper panel, when the lower door panel is upwardly hinged to lie alongside the upper door panel.

The opposite ends of the engine may be guarded by separate guard panels which can be of any suitable one of existing designs, and preferably also of such a kind as to be readily removable when required.

However, preferably the support structure may be formed on, or by part of the support frame or superstructure of the carding engine, and more preferably, the usual cylinder "bend" structure of the carding engine.

While a folding door panel structure comprises a particularly preferred form of door arrangement for use in the invention, according to a further aspect of the invention the door arrangement may comprise a series of horizontal strips hinged together in the manner of a "roller door" and which can be guided to move between a substantially vertical position guarding a respective side of the carding engine, and a raised position allowing access to the carding engine.

The raised position may be achieved by rolling the strips around an upper axle, or by sliding the strips through an overhead guide to an upper substantially horizontal position overlying the carding engine.

BRIEF DESCRIPTION OF THE DRAWINGS

Embodiments of carding engine guard according to the invention will now be described in detail, by way of example only, with reference to the accompanying drawing, in which.

DETAILED DESCRIPTION OF THE PREFERRED EMBODIMENT

Figure 1:
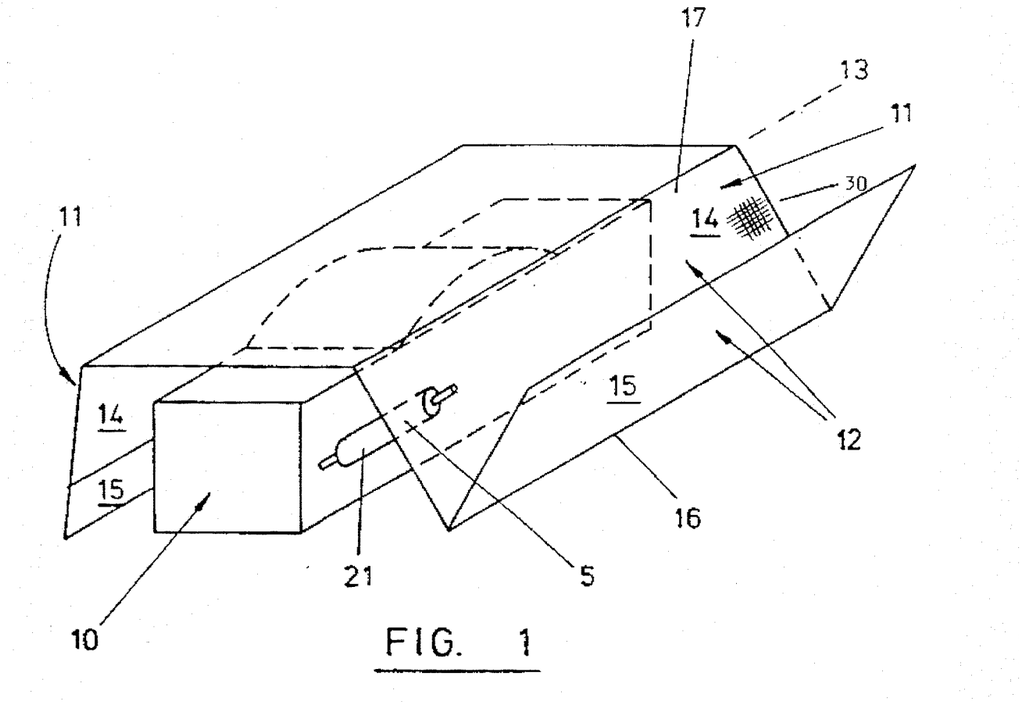
FIG. 1 is a schematic perspective illustration of a first embodiment of carding engine having a guard arrangement according to the invention arranged along each side thereof.
Figure 2:
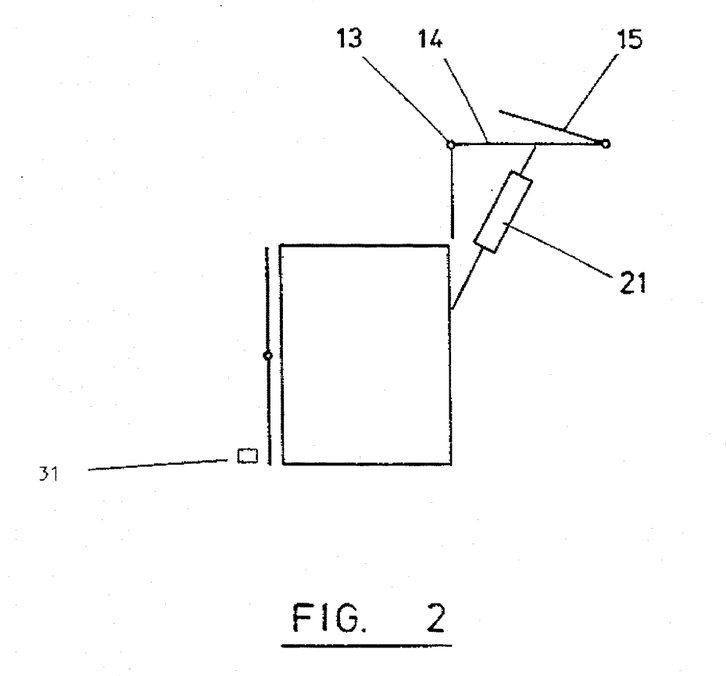
FIG. 2 is a schematic end view of the carding engine and the side guard arrangements, illustrating the manner by which each guard arrangement can hinge upwardly to a raised access position.

Referring now to FIGS. 1 and 2 of the drawings, a carding engine guard arrangement according to the invention will now be described in detail, and comprising a carding engine 10 having a general longitudinal axis, and respective guards 11 arranged along each side of the engine.

Although not shown in detail, usually guards will be provided to shield each end of the engine 10.

The construction of one of the guards 11 will now be described in detail, with reference to FIGS. 1 and 2, and in the illustrated embodiment, side guards 11 are of similar construction, for manufacturing convenience, although this is not essential to the invention.

Side guard structure 11 has a support structure (not shown in detail) which is arranged along one side of the carding engine 10, and a door arrangement 12 is pivotally mounted on the support structure to pivot about a substantially horizontal top hinge axis 13 at or near to the upper edge of the door arrangement, whereby the door arrangement 12 can pivot between a substantially vertical closed position, as shown on the left hand side of FIG. 1, which guards one side of the engine 10, and a raised position allowing access to the engine when the latter is inoperative.

FIG. 2 shows a fully closed position of a guard door arrangement 12 on the left hand side of the carding engine, and a fully raised position of the right hand guard door arrangement. FIG. 1 shows schematically initial stages in the movement of the right hand door arrangement from the closed position to the raised position.

In the illustrated arrangement, each door arrangement 12 extends substantially throughout the length of the engine and locking of the door to the floor via a releasable lock shown diagrammatically by reference 31 10, and provides a unitary structure which can be moved readily between the closed position and the raised access position allowing unrestricted access to the entire side of the carding engine. The construction of the door arrangement 12 is shown only schematically, but will take any suitable form to carry out the required guarding function. In one preferred arrangement, at least a portion of the door arrangement 12 incorporates a grid or mesh structure shown schematically by detail 30 in FIG. 1 to enable the working of the engine to be observed while the door is in the closed position.

Door arrangement 12 comprises upper and lower folding door panels 14 and 15, with the lower panel 15 being hinged to the upper panel 14 along an upper edge 16 of the lower panel 15 and the upper panel 14 being hinged along its upper edge 17 (see FIG. 1) to form the horizontal top hinge axis of the folding door panel assembly.

In order to raise the folding door panel assembly from the closed position to the raised position, it is necessary first to hinge the lower door panel 15 upwardly through approximately 180° in order to lie alongside the upper panel 14 and thereby form a folded door assembly. In this position, the door arrangement can provide access to the lower side parts of the carding engine. However, if access is required throughout the full height of the side parts of the carding engine, then it is only after this movement has been completed that the folded door assembly can be hinged upwardly about the top hinge axis through approximately 90° to take up the position shown in the right hand side of FIG. 2, under the action of extendible strut(s) 21. In this raised position, easy access is provided to the entire side of the engine for servicing/repair operations e.g. to the usual travelling "flats", the end of the main carding cylinder, the undercard arrangement etc, and without blocking passage to traffic moving alongside the engine.

For safety purposes, a safety interlock is provided, linked to the operation of the engine 10, and which is triggered to allow upward pivoting of the folded door assembly to the raised position only after the lower panel 15 has first completed its upward hinging movement and also while the engine is inoperative.

Figure 3:
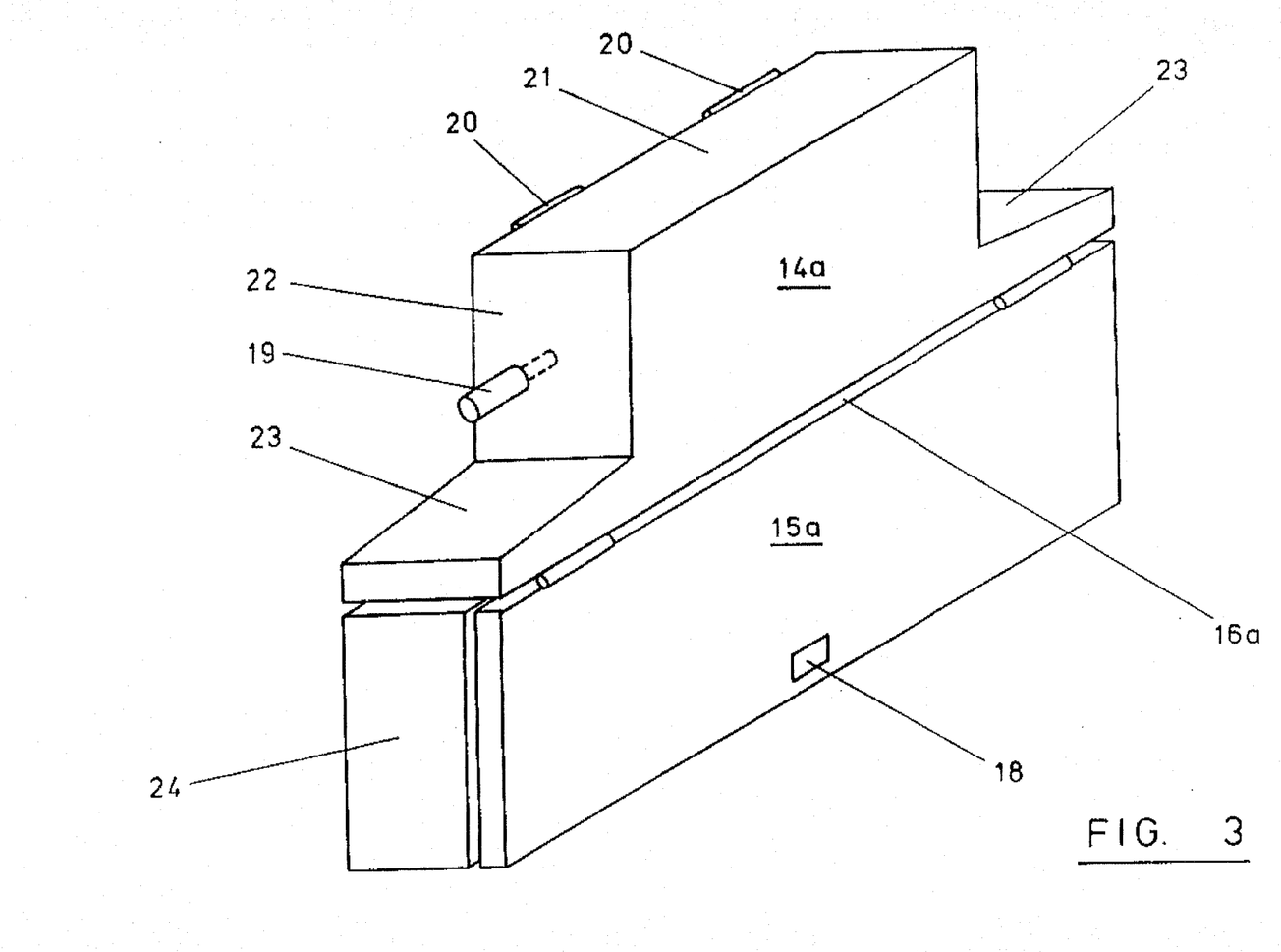
FIG. 3 is a schematic and perspective illustration of a second embodiment showing, in more detail, the manner by which folding upper and lower door panels of each guard arrangement can operate; and, FIGS. 4 to 6 illustrate, in perspective views, a practical embodiment of the invention, and showing respectively, closed, partly open and fully open positions of the guard arrangement.

A further embodiment is illustrated schematically in FIG. 3, and generally corresponding parts are designated by the same reference numerals, but with the addition of the letter a. In this embodiment, the panels 14a, 15a form part of a closure housing assembly which can move as a unit about upper hinges 20 to a fully open position after initial upward hinging movement of the lower panel 15a about hinge axis 16a to overlie the upper panel 14a. The unit assembly including panels 14a, 15a, top panel 21, end panels 22 and projecting side panels 23 can then move bodily to a stable open position by upward pivoting of the assembly about hinges 20. Lower end panels 24 will, however, remain fixed, and form part of a permanent end guard panel assembly of the carding engine.

A magnetic and proximity switch 18 is provided on the lower door panel 15a, which initiates release of the door arrangement to carry out its further movements to the raised position when the lower door panel has completed its upward hinging movement. The magnet retains the lower door panel 15a alongside the upper door panel 14a by co-operation with a suitable magnetic part on the upper panel, and safety interlock 19 can then be operated to release the folded door assembly for further joint upward hinging movement about top hinges 20.

The support structure on each side of the card 10 is arranged above the side parts of the carding engine to which access will be required for servicing/repair operations, and which forms part of the side frame structure of the carding engine. The support structure may be formed on, or by part of the usual cylinder superstructure and preferably the "bend" structure of the card.

Figure 4:
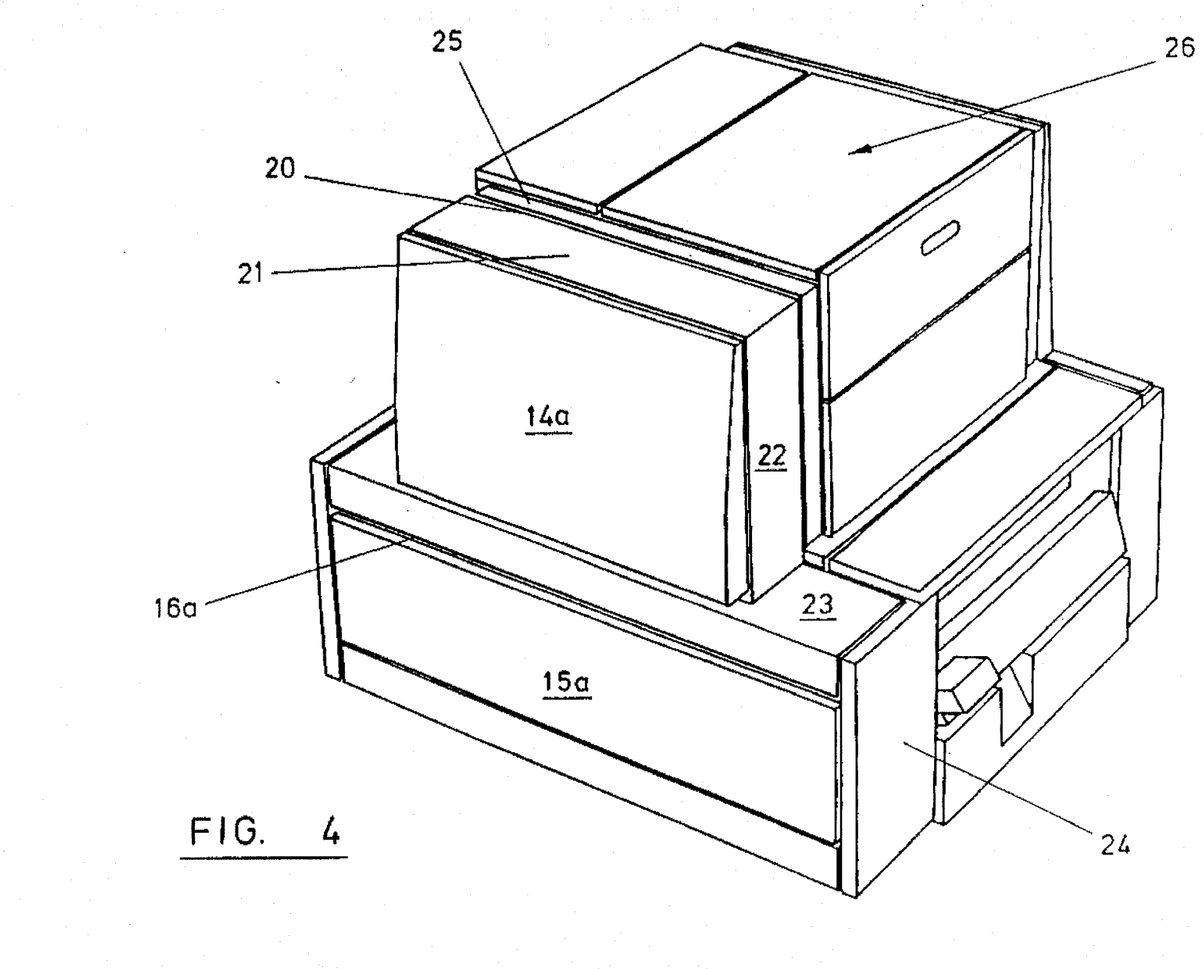
Figure 5:
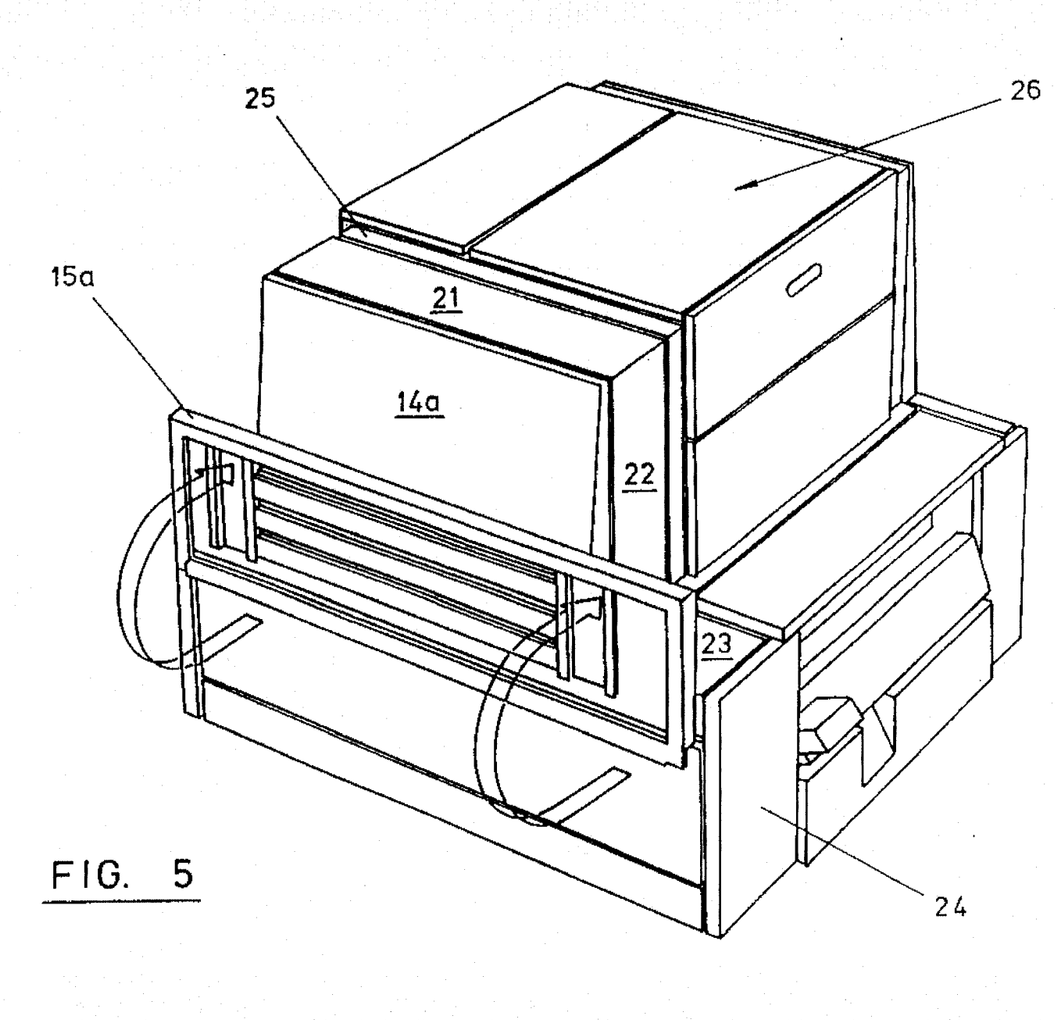
Figure 6:
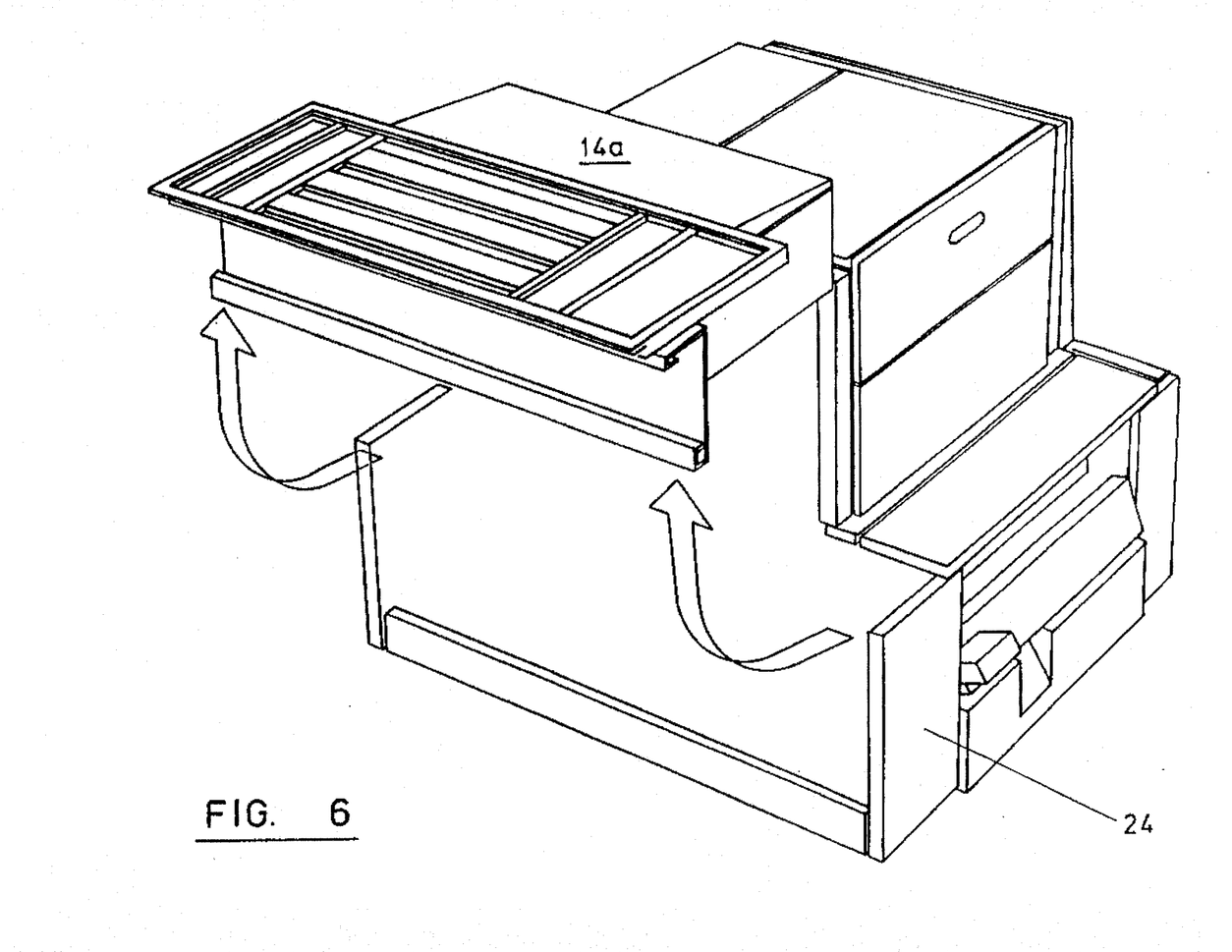

Referring to FIGS. 4 to 6, this shows a practical version of the schematic illustration of FIG. 3, and with FIG. 4 showing the closed guarding position, FIG. 5 showing an intermediate partly open position, and FIG. 6 showing the fully open position. Parts corresponding with the parts shown in FIG. 3 are given the same references and will not be described in detail again. The folding door guard arrangement of FIGS. 4 to 6 forms part of the external housing structure in which a carding engine is arranged, and also associated parts e.g. "bend" structure, travelling flats etc. The guard arrangement is illustrated as being hingedly mounted on an upper part 25 of a support structure of a housing 26 within which the carding engine and related parts are mounted.

We claim:

1. A carding engine guard arrangement comprising a carding engine having respective guards arranged along each side of the carding engine and extending generally parallel to a longitudinal axis of the carding engine, each of the guards being movable between a closed position in which the guard shields associated side parts of the carding engine and an open position in which the guard allows access to be had to the side parts of the carding engine for servicing/repair purposes, in which at least one of the guards comprises:

a support structure arranged along one side of the carding engine above the side parts of the carding engine which require to be shielded during operations but to which access will be required for servicing/repair operations; and a door arrangement pivotally mounted on the support structure to pivot about a substantially horizontal hinge axis of a first hinge disposed at or near to an upper edge of the door arrangement between the closed and open positions, said door arrangement comprising a pair of upper and lower folding door panels in which the lower panel is hinged to the upper panel by a second hinge disposed at an upper edge of the lower panel, and the upper panel is hinged along its upper edge about the substantially horizontal hinge axis of the door arrangement.

2. A carding engine guard arrangement according to claim 1, wherein the door arrangement includes a grid or mesh structure to enable working of the carding engine to be viewed through the carding engine guard arrangement.

3. A carding engine guard arrangement according to claim 1, wherein the lower door panel is hingeable movable upward through approximately 180° to form a folded door assembly and allow access to lower side parts of the carding engine, and thereafter the folded door assembly is hingeable upwardly about the substantially horizontal hinge axis through approximately 90° to take up a raised access position when full access is required throughout a height of the side parts of the carding engine.

4. A carding engine guard arrangement according to claim 3, wherein a safety interlock is provided and connected to the upper panel in an operation of the carding engine and arranged to be triggered to allow upward pivoting of the folded door assembly to the raised access position only after the lower panel has first completed its upward hinging movement and when the carding engine is inoperative.

5. A carding engine guard arrangement according to claim 1, wherein a bottom edge of the door arrangement is releasably locked to a floor, whereby when the door arrangement is moved to a raised open position, no obstruction is presented to full access to an entire side and ends of the carding engine.

6. A carding engine guard arrangement according to claim 1, wherein the support structure comprises part of a "bend" structure of the carding engine.

7. A carding engine guard arrangement comprising a carding engine having respective guards arranged along each side of the carding engine and extending generally parallel to a longitudinal axis of the carding engine, each of the guards being movable between a closed position in which the guard shields associated side parts of the carding engine and an open position in which the guard allows access to be had to the side parts of the carding engine for servicing/repair purposes, in which at least one of the guards comprises:

a support structure arranged along one side of the carding engine above the side parts of the carding engine which require to be shielded during operation but to which access will be required for servicing/repair operations, said support structure forming part of a side frame structure of the carding engine; and a door arrangement pivotally mounted on the support structure to pivot about a substantially horizontal hinge axis of a first hinge disposed at or near to an upper edge of the door arrangement between the closed position shielding an associated side of the carding engine and a raised open position allowing access to the side parts of the carding engine when the carding engine is inoperative, and in which the door arrangement provides unimpeded access throughout a length of the side parts of the carding engine when the door arrangement is in the raised open position.

8. A carding engine guard arrangement according to claim 7, wherein the door arrangement comprises a pair of upper and lower folding door panels, the lower panel being hinged to the upper panel by a second hinge disposed at an upper edge of the lower panel, and the upper panel being hinged along its upper edge about the substantially horizontal hinge axis of the door arrangement.

9. A carding engine guard arrangement according to claim 8, wherein a magnet and proximity switch is provided on the lower door panel, and which is operable to initiate release of the door arrangement to carry out its further movement to a raised position where the lower door panel has completed its movement.

* * * * *

UNITED STATES PATENT AND TRADEMARK OFFICE
CERTIFICATE OF CORRECTION

PATENT NO. : 5,537,717

DATED : July 23, 1996

INVENTOR(S) : Carey et al.

It is certified that error appears in the above-identified patent and that said Letters Patent is hereby corrected as shown below:

In column 4, line 27, insert --and locking of the door to the floor via a releasable lock shown diagrammatically by reference 31-- after the word "engine".

In column 4, lines 33,34,35, delete "and locking of the door to the floor via a releasable lock shown diagrammatically by reference 31", after the word "engine".

Signed and Sealed this

Twenty-sixth Day of August, 1997

*Attest:*

BRUCE LEHMAN

*Attesting Officer*  Commissioner of Patents and Trademarks